(12) United States Patent
Fan et al.

(10) Patent No.: US 11,667,181 B2
(45) Date of Patent: Jun. 6, 2023

(54) LAWN MOWER AND BATTERY PACKAGE ASSEMBLY THEREOF

(71) Applicant: Globe (Jiangsu) Co., Ltd, Jiangsu (CN)

(72) Inventors: Jun Fan, Jiangsu (CN); Chaoqun Wang, Jiangsu (CN); Qunli Wei, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 192 days.

(21) Appl. No.: 17/113,044

(22) Filed: Dec. 5, 2020

(65) Prior Publication Data

US 2021/0170852 A1 Jun. 10, 2021

(30) Foreign Application Priority Data

Dec. 5, 2019 (CN) .......................... 201911232131.1

(51) Int. Cl.
| | | |
|---|---|---|
| *B60K 1/04* | (2019.01) | |
| *A01D 34/64* | (2006.01) | |
| *A01D 34/78* | (2006.01) | |
| *A01D 69/02* | (2006.01) | |
| *A01D 101/00* | (2006.01) | |

(52) U.S. Cl.
CPC ................ *B60K 1/04* (2013.01); *A01D 34/64* (2013.01); *A01D 34/78* (2013.01); *A01D 69/02* (2013.01); *A01D 2101/00* (2013.01); *B60K 2001/0416* (2013.01); *B60K 2001/0477* (2013.01)

(58) Field of Classification Search
CPC .............. B60K 1/04; B60K 2001/0416; B60K 2001/0477; A01D 34/64; A01D 34/78; A01D 69/02; A01D 2101/00
See application file for complete search history.

(56) References Cited

U.S. PATENT DOCUMENTS

| | | | |
|---|---|---|---|
| 5,553,445 A | 9/1996 | Lamb et al. | |
| 9,241,849 B1 * | 1/2016 | Caskey | |
| 9,962,130 B1 * | 5/2018 | Ocel | |
| 10,029,551 B2 | 7/2018 | Ito et al. | |
| 10,493,835 B2 | 12/2019 | Ito et al. | |
| 2012/0186887 A1 | 7/2012 | Moriguchi et al. | |
| 2018/0028383 A1 * | 2/2018 | Stryker | .................. A61G 1/017 |
| 2018/0118129 A1 * | 5/2018 | Smith | ........................ B60P 3/14 |
| 2019/0014718 A1 * | 1/2019 | Uemura | .................. B60L 50/66 |

* cited by examiner

*Primary Examiner* — James A Shriver, II
*Assistant Examiner* — Nicholas R. Kandas

(57) ABSTRACT

The invention provides a mower, which comprises a battery package assembly and a frame for bearing the battery package assembly; the battery package assembly comprises a battery package and a fixing plate, the battery package is fixed on the fixing plate, a plurality of first pulleys are arranged at the bottom of the fixing plate, and the first pulleys are distributed along the installation direction of the battery package assembly. The frame comprises a supporting surface, and the first pulleys are supported on the supporting surface. The battery package assembly of the lawn mower moves on the supporting surface in a rolling mode, generated friction force is small, and convenience and labor saving can be achieved for the mounting and dismounting processes of the battery package assembly.

17 Claims, 4 Drawing Sheets

LAWN MOWER AND BATTERY PACKAGE ASSEMBLY THEREOF

CROSS-REFERENCE TO RELATED INVENTIONS

This invention is a US application which claims the priority of CN application Serial No. CN201911232131.1, filed on Dec. 5, 2019, the disclosures of which are hereby incorporated by reference in their entirety.

TECHNICAL FIELD

The invention relates to a mower, in particular to a mower using a battery package as power.

BACKGROUND ART

With continuous improvement of people's living standard, the requirements on lawn care are increased year by year. A green lawn is an indispensable part of garden construction and the urban environment. Existing lawn mowers in the market substantially include three types: one type is riding type, people sit on the lawn mower to work as the name suggests, the lawn mower is generally four-wheeled, this type of lawn mower has a high power and a high efficiency and is suitable for mowing large-area lawns, such as football fields, golf courses, large-area park lawns and the like; another type is pushing type, this type of lawn mower has low power and a small intake volume, and is suitable for mowing small-area lawns, such as green belts on two sides of a road; the third type is a handheld type, this type of lawn mower is smaller and lighter, and is suitable for very small-area lawn that cannot be reached by a large lawn mower. A traditional lawn mower usually uses gasoline or diesel oil as fuel and uses an engine for power to work. With the development of battery technology, more and more lawn mowers use motors for power and use a battery package as the power source, for the lawn mower requires high power, the battery package assembly needed to be equipped is generally heavy, and it is inconvenient to maintain or replace the battery package.

In view of this, there is a need for a new lawn mower and a new battery package assembly to solve the above problems.

SUMMARY OF INVENTION

The object of the present invention is to provide a mower and a battery package assembly thereof, wherein the battery package assembly can be conveniently and effortlessly assembled or disassembled.

To achieve the above object, the present invention provides a battery package assembly, comprising: a battery package; and a fixing plate for mounting the battery package, wherein, a plurality of first pulleys are arranged on the bottom of the fixing plate and disposed along an installation direction of the battery pack assembly.

As a further improvement of the present invention, the fixing plate comprises a plurality of foldable supporting legs, each supporting leg is pivotally connected to the fixing plate and includes a second pulley at a bottom of the supporting leg.

As a further improvement of the present invention, the supporting legs comprises a folded state and an unfolded state, when the supporting legs are in the folded state, the supporting legs are horizontally arranged at a bottom side of the fixing plate, and when the supporting legs are in the unfolded state, the supporting legs extend downwards from the fixing plate.

As a further improvement of the present invention, a length of the supporting leg is adjustable.

As a further improvement of the present invention, the supporting legs comprise an upper section and a lower section, the lower section is configured as a hollow structure, and sleeves on the upper section, and the lower section is slidable along the length of upper section, the second pulley is installed at a bottom of the lower section.

As a further improvement of the present invention, the fixing plate comprises a handle on a side thereof.

As a further improvement of the present invention, the battery package assembly comprises six first pulleys and four supporting legs, four of the first pulleys are distributed on four corners of the battery package assembly, and the other two first pulleys are located on the middle of two longitudinal sides of the battery package assembly; four supporting legs are arranged at four corners of the fixing plate.

To achieve the above object, the present invention further provides a lawn mower, comprising: a battery package assembly, comprising a fixing plate and a battery package mounted on the fixing plate, wherein, a plurality of first pulleys are arranged on the bottom of the fixing plate and disposed along an installation direction of the battery pack assembly; and a frame comprises a supporting surface for supporting the first pulleys.

As a further improvement of the present invention, the fixing plate comprises a plurality of foldable supporting legs, each supporting leg is pivotally connected to the fixing plate and includes a second pulley on a bottom of the supporting leg.

As a further improvement of the present invention, the supporting legs comprise a folded state and an unfolded state, when the supporting legs are in the folded state, the supporting legs are horizontally arranged at a bottom side of the fixing plate, and when the supporting legs are in the unfolded state, the supporting legs extend downwards from the fixing plate.

As a further improvement of the present invention, the supporting legs comprise an upper section and a lower section, the lower section is configured as a hollow structure, and sleeves on the upper section, and the lower section is slidable along the length of upper section, the second pulley is installed at a bottom of the lower section.

As a further improvement of the present invention, the fixing plate comprises a handle on a side thereof.

As a further improvement of the present invention, the battery package assembly comprises six first pulleys and four supporting legs, four of the first pulleys are distributed on four corners of battery package assembly, and the other two first pulleys are located on the middle of two longitudinal sides of the battery package assembly; four supporting legs are arranged at four corners of the fixing plate.

As a further improvement of the present invention, the frame comprises a plurality of guiding rails, the guide rails are arranged in rows for guiding the first pulleys to roll inside.

As a further improvement of the present invention, the frame comprises a tail beam with a stopper.

DESCRIPTION OF EMBODIMENT

In order to make the objectives, technical solutions, and advantages of the present invention clearer, the following describes the present invention in detail with reference to the accompanying drawings and specific embodiment.

Figure 1:
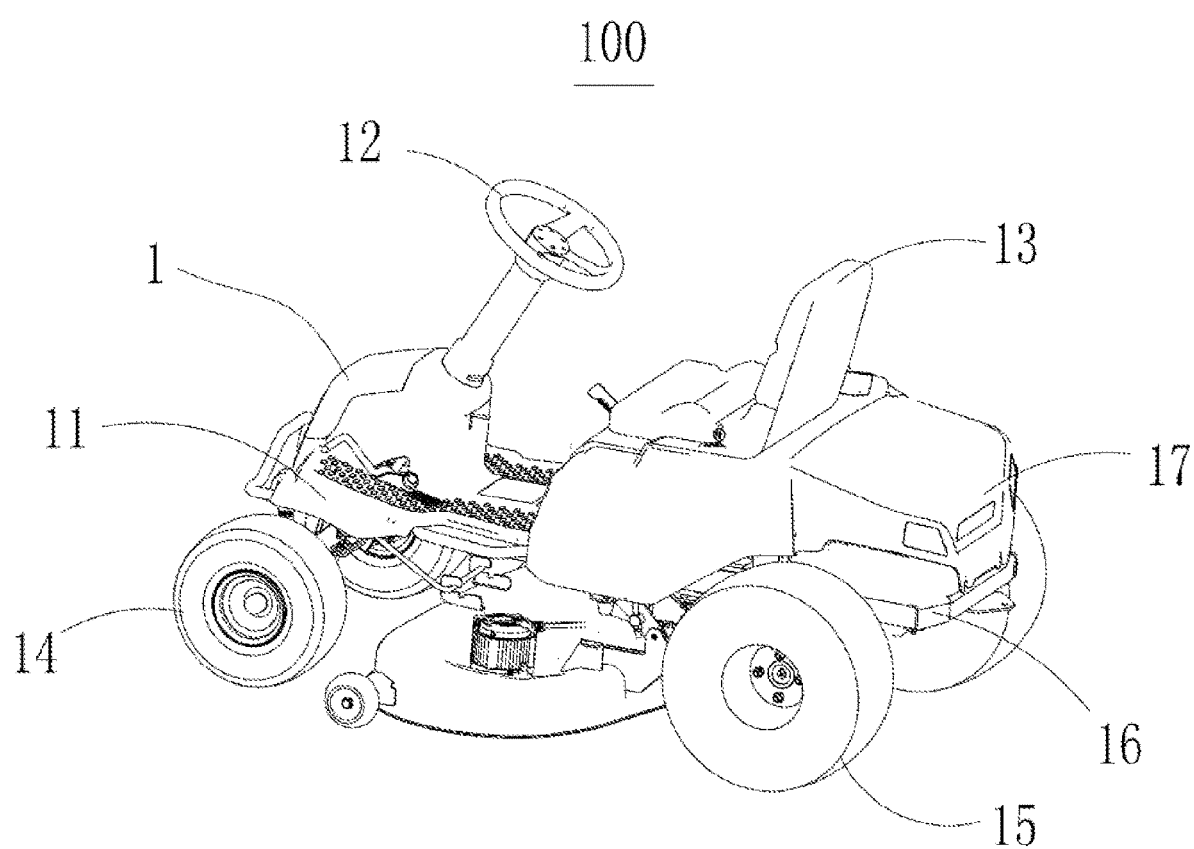
FIG. 1 is a perspective view of a lawn mower according to one embodiment of the present invention.

Referring to FIG. 1, a lawn mower 100 according to an embodiment of the present invention is a riding lawn mower 100, which is also called a lawn tractor. The lawn mower 100 comprises a main body 1, which has a vehicle body 11, a steering wheel 12 disposed on the vehicle body 11, a seat 13 fixed to the vehicle body 11, two front wheels 14 and two rear wheels 15 provided in front of and in rear of the vehicle body 11, respectively. The main body 1 is also provided with a motor assembly and a cutting device, the motor assembly comprises a first motor for driving the cutting device and a second motor for driving the rear wheels 15 to rotate, the first motor and the second motor can be brushless motors or brush motors. A controlling device for controlling the operation of the first motor and the second motor is further arranged on the vehicle body 11. The cutting device generally has a blade and a protective cover, the blade is provided within the protective cover, the blade is driven to rotate by the first motor. In use, an operator sits on the seat 13 of the lawn mower 100, and controls a traveling direction of the front wheels 4 by operating the steering wheel 12, and controls the cutting device by the controlling device.

Figure 2:
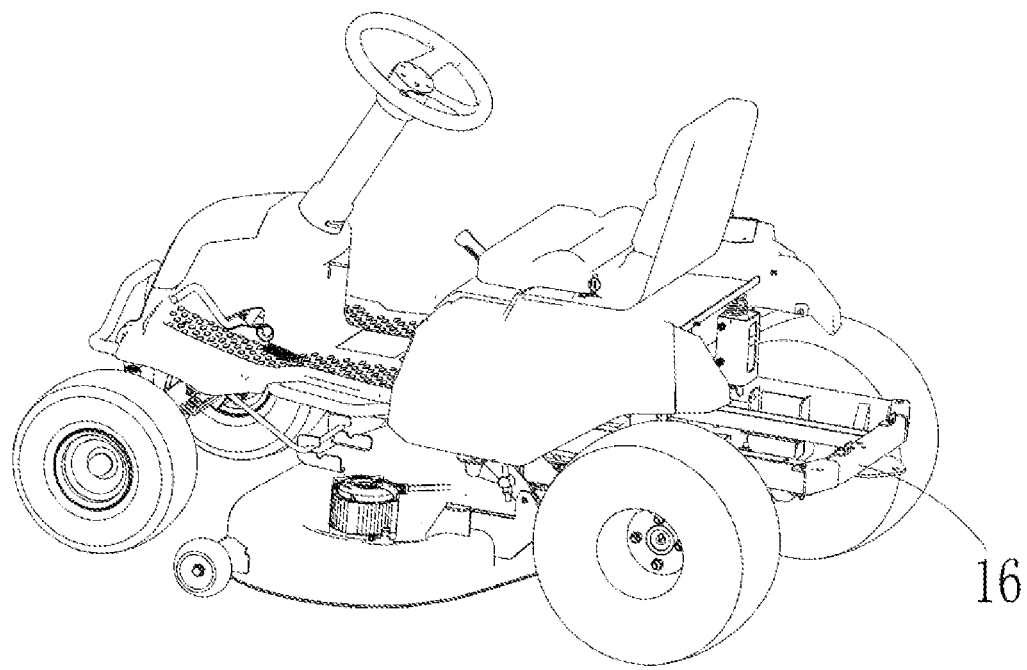
FIG. 2 is a perspective view of a lawn mower according to one embodiment of the present invention, in which a rear cover and a battery package assembly of the lawn mower are removed.
Figure 3:
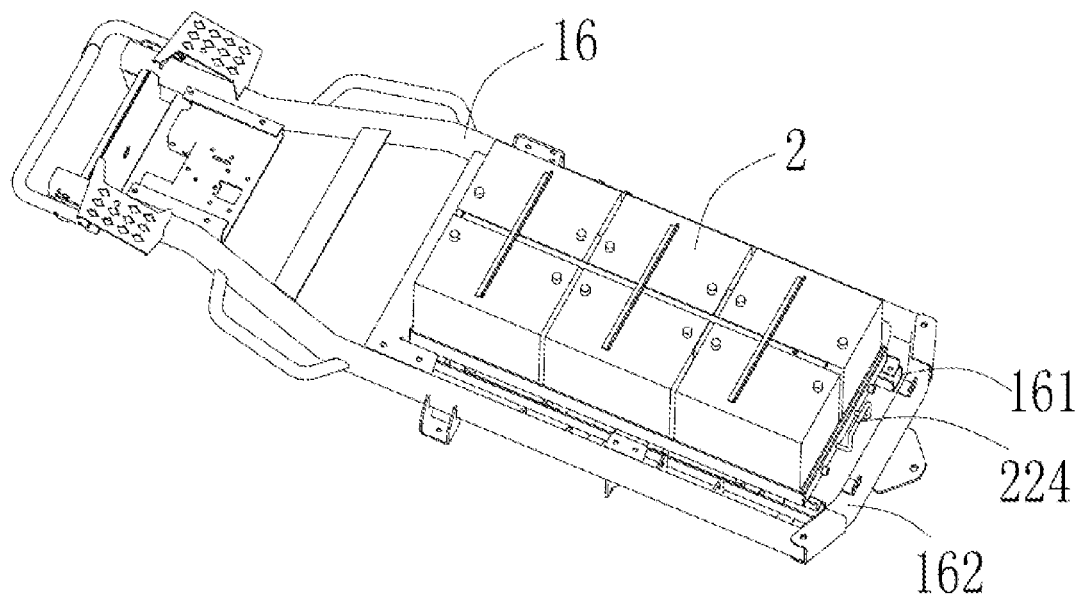
FIG. 3 is a perspective view of a frame of the lawn mower and the battery package assembly in an assembled state.

Referring to FIG. 2 and FIG. 3, the lawn mower 100 further is provided with a battery package assembly 2 for providing power for the first motor and the second motor, the battery package assembly 2 may use a lithium battery, lead-acid battery, graphene battery, or combustible ice battery, and in this embodiment, the lithium battery is taken as an example for description. The vehicle body 11 is provided with a frame 16 on a rear thereof, the battery package assembly 2 is mounted to the frame 16 from a rear side, the vehicle body 11 further has a rear cover 17 (see FIG. 1), and the rear cover 17 is fixed to the frame 16 and covers the battery package assembly 2 to prevent the battery package assembly 2 from being exposed.

Figure 4:
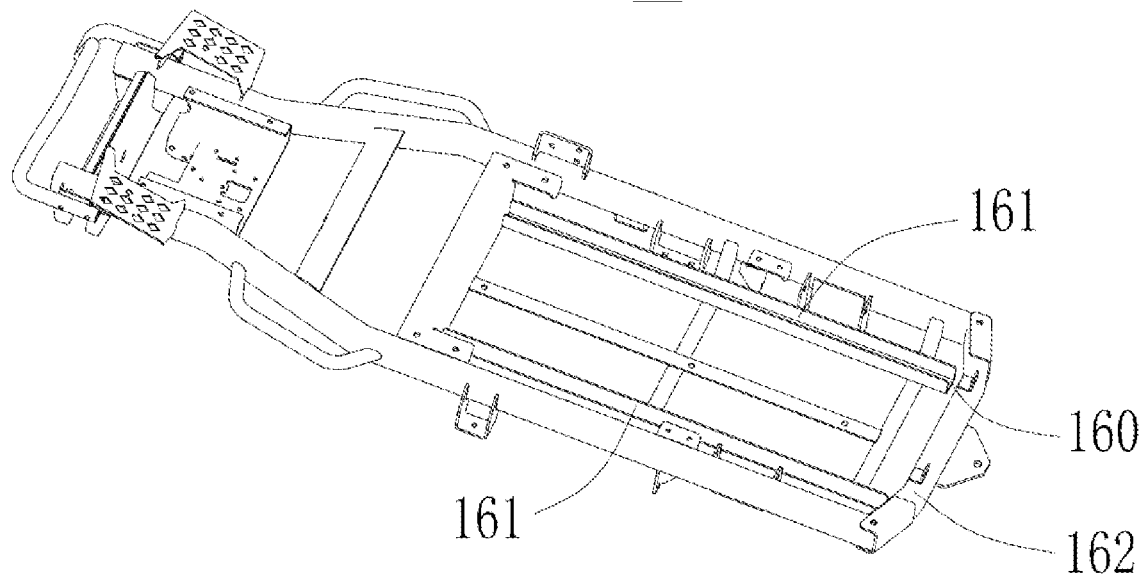
FIG. 4 is a perspective view of the frame.
Figure 5:
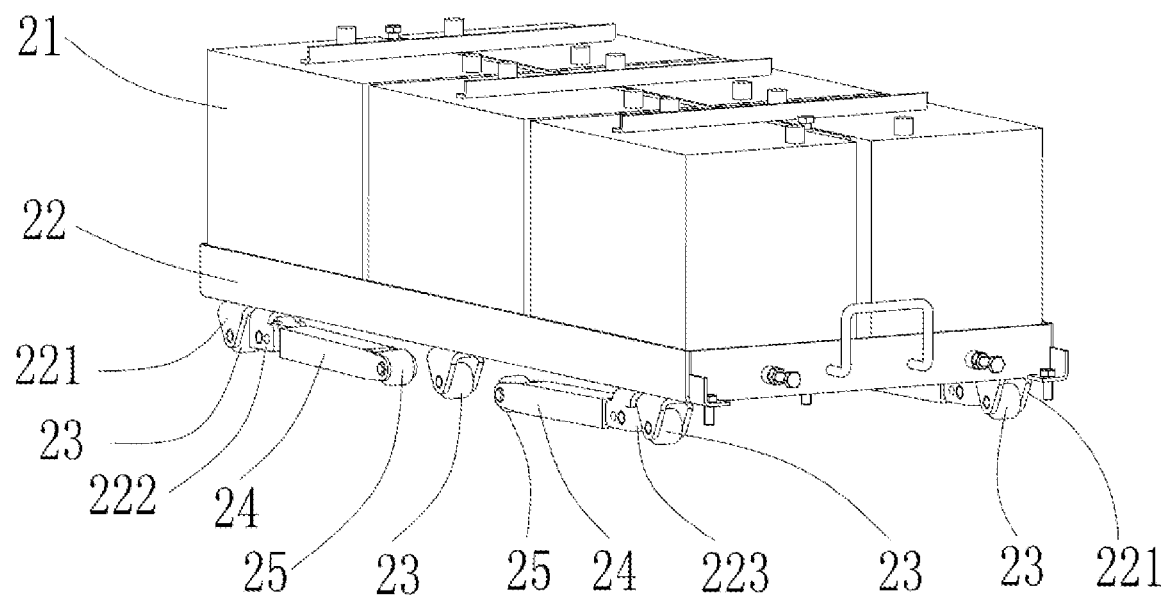
FIG. 5 is a perspective view of the battery package assembly.

Referring to FIG. 3 to FIG. 5, the battery package assembly 2 has a battery package 21 and a fixing plate 22, the battery package 21 may comprise a plurality of batteries, and the battery package 21 may be fixed to the fixing plate 22 by connecting members such as screws to form an integral component with the fixing plate 22. The frame 16 is a frame-like structure and has a supporting surface 160 for supporting the battery package assembly 2. The fixing plate 22 is mounted with a plurality of first pulleys 23 on a bottom side thereof, and the first pulleys 23 are supported on the supporting surface 160. At assembly time, the battery package assembly 2 is moved forward from the rear side, and the first pulleys 23 rolls on the supporting surface 160 of the frame 16. Compared with the surface-to-surface sliding friction mode in the prior arts, the friction force in the pulley rolling mode is smaller, and an operator can effortlessly mount or dismount the battery package assembly 2.

The battery package assembly 2 is substantially rectangular, wherein a front and rear direction is the longitudinal direction thereof, and the first pulleys 23 are distributed along the longitudinal direction. In the present embodiment, there are six first pulleys 23, four of the six first pulleys 23 are located at four corners of the battery package assembly 2 and the other two first pulleys 23 are located on the middle portions of two longitudinal sides of the battery package assembly 2. That is, the six first pulleys 23 are divided into two rows, and the first pulleys 23 in each row are uniformly distributed along the longitudinal side of the battery package assembly 2, the six first pulleys 23 cooperatively support the battery package assembly 2 to ensure the battery package assembly 2 can smoothly move. The specific number of the first pulleys 23 is not particularly limited, and this embodiment is only to illustrate six first pulleys 23 for example, preferably there are three or more first pulleys 23 which are preferably uniformly distributed, so as to uniformly support the battery package assembly 2 during moving.

The frame 16 comprises two guiding rails 161 corresponding to the first pulleys 23 in two rows. The guiding rail 161 may be disposed by being separately molded and then welded to the frame 16, the guiding rail 161 extending in the front and rear direction, and the bottom surface of the guiding rail 161 is the supporting surface 160. When assembling the battery package assembly 2, the first pulley 23 enters the guiding rail 161 and rolls in the guiding rail 161. The guiding rail 161 can guide the battery package assembly 2 to move and ensure that the battery package assembly 2 is accurately fixed, so that the battery package assembly 2 can match and connect with a plug connector inside the lawn mower 100 so as to provide a power source for the lawn mower 100.

The frame 16 further has a tail beam 162 located behind the battery package assembly 2, after the battery package assembly 2 is mounted in place, a readily detachable stopper (not shown) is fixed on the tail beam 162 to prevent the battery package assembly 2 from sliding backwards. The stopper (not shown) can be a bolt, and is convenient to assemble and disassemble.

The battery package assembly 2 further comprises a plurality of supporting legs 24, each supporting leg 24 is installed with a second pulley 25 at a bottom thereof, which is also called a bottom end. The supporting legs 24 comprises a folded state and an unfolded state, when the supporting legs 24 are in the folded state, the supporting legs 24 are horizontally arranged at a bottom side of the fixing plate 22, and when the supporting legs 24 are in the unfolded state, the supporting legs 24 extend downwards from the fixing plate 22. The supporting leg 24 is pivotally connected with the fixing plate 22 at a top thereof, so that the supporting legs 24 can be folded, and the supporting legs 24 are opened for supporting the battery package assembly 2 on the ground when the battery package assembly 2 is detached and installed.

In the present embodiment, the battery package assembly 2 has four supporting legs 24, two supporting legs 24 are disposed on a front side and two supporting legs 24 are disposed on a rear side; four supporting legs 24 are arranged at four corners of the fixing plate. In fact, the specific number of supporting legs 24 is not limited, alternatively, there may be three supporting legs 24, for example, two supporting legs 24 are disposed on the rear side and one supporting leg 24 is disposed on the front side; or there may be more than four supporting legs 24 as long as the battery package assembly 2 can be stably supported.

The supporting legs 24 are horizontally disposed on a bottom side of the fixing plate 22 when being folded. A length of the supporting legs 24 is designed according to the height of the frame 16 from the ground such that the absolute height of the battery package assembly 2 remains substantially constant during the disassembling or assembling process. When the battery package assembly 2 partially removed from the frame 16, two supporting legs 24 on the rear side open and support on the ground by the second pulleys 25, so as to support the battery package assembly 2 in cooperation with the frame 16.

In the present embodiment, the length of the supporting leg 24 is adjustable, the supporting leg 24 has an upper section 241 and a lower section 242, the upper section 241 is connected to the fixing plate 22, and the lower section 242 has a hollow structure. When the supporting leg 24 is folded, the lower section 242 is sleeved outside the upper section 241 to reduce the overall occupied space of the supporting leg 24. When the supporting leg is open, the lower section 242 is pulled downwardly to move downwardly, and the lower section 242 after moving downwardly is positioned to the upper section 241 through concave-convex structures therebetween, so that the overall length of the supporting leg 24 is extended.

The fixing plate 22 is provided with six first mounting brackets 221 and four second mounting brackets 222, the first mounting bracket 221 is of an inverted U-shaped structure, and the first pulley 23 is pivotally connected to openings of the first mounting brackets 221. The second mounting bracket 222 also has an opening, and the top of the upper section 241 of the supporting leg 24 is pivotally connected to the opening of the second mounting bracket 222. The first mounting brackets 221 and the second mounting brackets 222 may be fixed to the bottom side of the fixing plate 22 by welding, and are arranged in two rows, each row includes three first mounting brackets 221 and two second mounting brackets 222, and the two second mounting brackets 222 are spaced between each two adjacent first mounting brackets 221.

The second mounting bracket 222 can also limit the supporting legs 24 from over-rotating, and specifically, the second mounting bracket 222 which is corresponding to the supporting leg 24 located at the front side, is provided with a blocking wall (not shown) for preventing corresponding supporting leg 24 located in a vertical direction from continuing to rotate forwardly; and the second mounting bracket 222 which is corresponding to the supporting leg 24 on the rear side, is provided with a blocking wall 223 for preventing corresponding supporting leg 24 located in the vertical direction from continuing to rotate backwardly. The supporting leg 24 defines a U-shaped opening 243 on the bottom end thereof, and the second pulley 25 is pivotally connected within the U-shaped opening 243.

Figure 6:
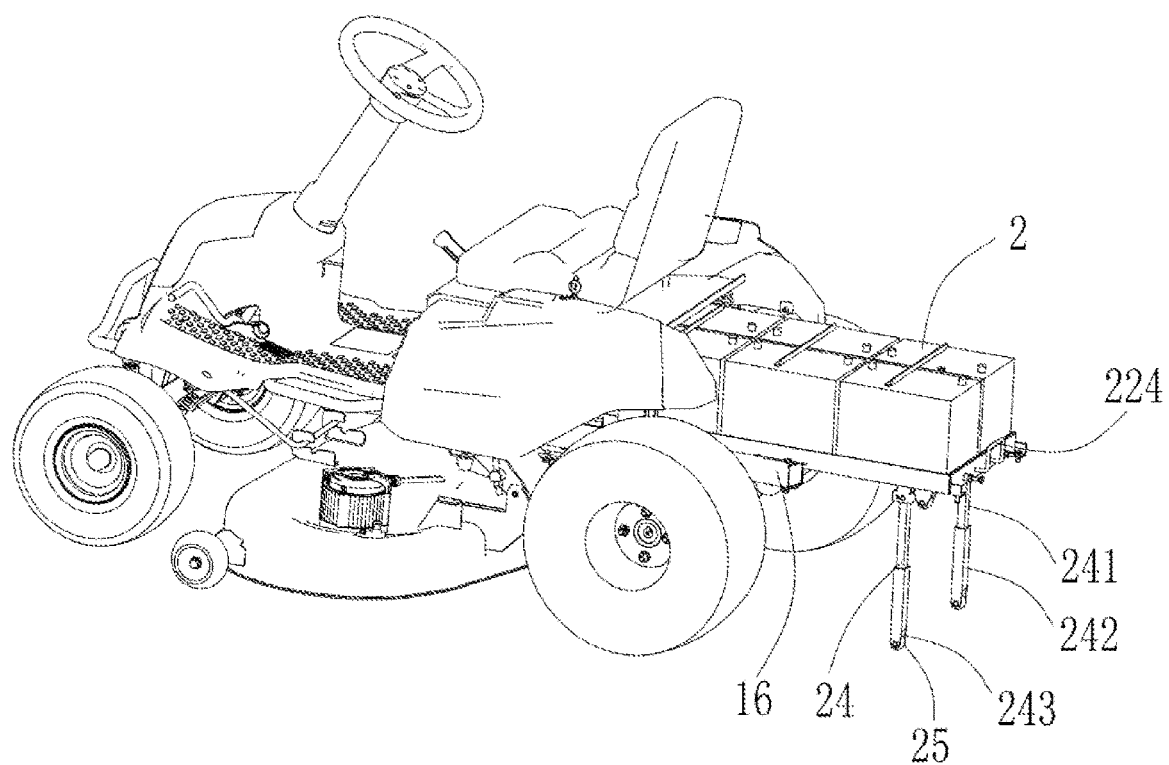
FIG. 6 is a perspective view of the frame and the battery package assembly during disassembling.

The battery package assembly 2 comprises a handle 224 at a rear side of the fixing plate 22, when the operator disassembles the battery package assembly 2, firstly, open the rear cover 17 and remove the stopper (not shown), and then hold the handle 224 to pull the battery package assembly 2 backwardly. Referring to FIG. 6, after escaping from the limitation of the frame 16, the two supporting legs 24 on the rear side can be opened manually or automatically, and corresponding second pulleys 25 contact the ground. At this time, the gravity center of the battery package assembly 2 is still on the frame 16, and the frame 16 can support the battery package assembly 2 alone, so before the two supporting legs 24 on the rear side are opened, the battery package assembly 2 will not fall off. A line connecting two center points of the two longitudinal sides of the battery package assembly 2 is defined as a center line. Front ends of the rear supporting legs 24 in the folded state are designed to be positioned on a rear side of the center line, so that it is ensured that the rear supporting legs 24 are able to support on the ground before a half of the battery package assembly 2 in the longitudinal direction is removed from the frame 16.

Figure 7:
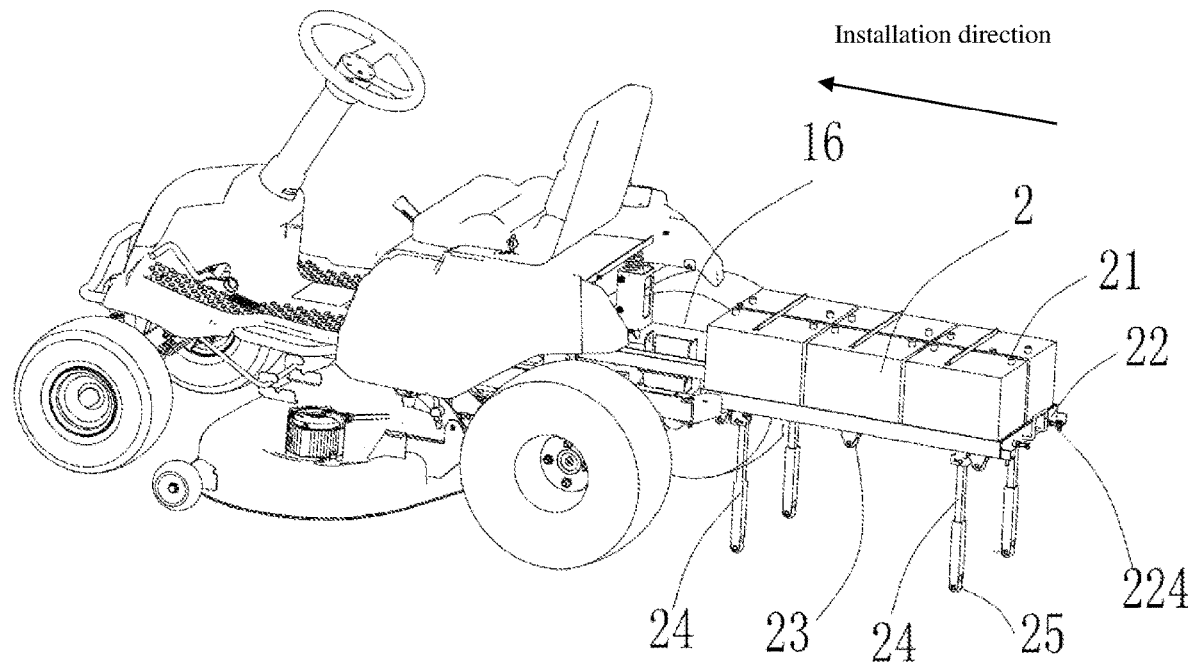
FIG. 7 is a perspective view of the frame and the battery package assembly after disassembly.

Continuing to pull the battery package assembly 2 rearward, the supporting legs 24 cooperate with the frame 16 to support the battery package assembly 2. As shown in FIG. 7, after escaping from the limitation of the frame 16, the two supporting legs 24 on the front side are opened manually or automatically, the corresponding second pulleys 25 contact the ground, then the battery package assembly 2 is completely disassembled from the frame 16, the supporting legs 24 on the front side and the rear side support the battery package assembly 2 together. In the whole process, the battery package assembly 2 always moves through the rolling of the first pulleys 23 and the second pulleys 25, so that the friction force is small, and the labor is saved. The battery package assembly 2 is always in a state of being supported by the frame 16 and/or the supporting legs 24, so that an operator does not need to lift the battery package assembly 2 or use other carrying tools, and the whole disassembly process is very convenient.

A process of assembling the battery package assembly 2 is the reverse of the above process, firstly, align the two rows of first pulleys 23 with the guiding rails 161, then push the battery package assembly 2 forwardly, fold the supporting legs 24 on the front side, continue to push the battery package assembly 2 forwardly till the gravity center of the battery package assembly 2 moves to the frame 16, then fold the supporting legs 24 on the rear side and continue to push the battery package assembly 2 forwardly, after the battery package assembly 2 arrives at its installed position, finally install the stopper (not shown) and cover the rear cover 17, the assembly of the battery package assembly 2 is finished. In the whole installation process, the battery package assembly 2 always moves through the rolling of the first pulley 23 and the second pulley 25, the friction force is less, less labor is needed, and the battery package assembly 2 does not need to be carried by tools or to be lifted.

The above embodiment is only used to illustrate the present invention and not to limit the technical solutions described in the present invention. The understanding of this specification should be based on those skilled in the art, although the present invention has been described in detail with reference to the above embodiment. However, those skilled in the art should understand that those skilled in the art can still modify or equivalently replace the present invention, and all technical solutions and improvements that do not depart from the spirit and scope of the present invention should be within the scope of the claims of the invention.

What is claimed is:

1. A battery package assembly, comprising:
   a battery package; and
   a fixing plate for mounting the battery package,
   wherein, a plurality of first pulleys are arranged on the bottom of the fixing plate and disposed along an installation and disassembling direction of the battery pack assembly;
   wherein the fixing plate further comprises a plurality of foldable supporting legs each having a folded state and an unfolded state, each supporting leg comprises a top end that is pivotally connected to the fixing plate and a bottom end at which a second pulley is installed;

the top end of each supporting leg is arranged at a corner of the fixing plate, and each supporting leg in the folded state is configured to extend from the top end thereof, along the installation and disassembling direction, towards a gravity center position of the battery package assembly, but the bottom end of each supporting leg does not extend beyond the gravity center.

2. The battery package assembly according to claim 1, wherein when the supporting legs are in the folded state, the supporting legs are horizontally arranged at a bottom side of the fixing plate, and when the supporting legs are in the unfolded state, the supporting legs extend downwards from the fixing plate.

3. The battery package assembly according to claim 2, wherein a length of each supporting leg is adjustable.

4. The battery package assembly according to claim 3, wherein each supporting leg comprises an upper section and a lower section, the lower section is configured as a hollow structure, and sleeves on the upper section, and the lower section is slidable along the length of the upper section, the second pulley is installed at a bottom of the lower section.

5. The battery package assembly according to claim 1, wherein the fixing plate further comprises a handle on a side thereof.

6. The battery package assembly according to claim 1, wherein the battery package assembly further comprises six first pulleys and four supporting legs, four of the six first pulleys are distributed on four corners of the battery package assembly, and the other two first pulleys are located on the middle of two longitudinal sides of the battery package assembly; four supporting legs are arranged at four corners of the fixing plate.

7. A lawn mower, comprising:
a battery package assembly, comprising a fixing plate and a battery package mounted on the fixing plate, wherein, a plurality of first pulleys are arranged on the bottom of the fixing plate and disposed along an installation and disassembling direction of the battery pack assembly; and a frame comprises a supporting surface for supporting the first pulleys;

wherein the fixing plate further comprises a plurality of foldable supporting legs each having a folded state and an unfolded state, each supporting leg comprises a top end that is pivotally connected to the fixing plate and a bottom end at which a second pulley is installed;

the top end of each supporting leg is arranged at a corner of the fixing plate, and each supporting leg in the folded state is configured to extend from the top end thereof, along the installation and disassembling direction, towards a gravity center position of the battery package assembly, but the bottom end of each supporting leg does not extend beyond the gravity center.

8. The lawn mower according to claim 7, wherein when the supporting legs are in the folded state, the supporting legs are horizontally arranged at a bottom side of the fixing plate, and when the supporting legs are in the unfolded state, the supporting legs extend downwards from the fixing plate.

9. The lawn mower according to claim 8, wherein each supporting leg comprises an upper section and a lower section, the lower section is configured as a hollow structure, and sleeves on the upper section, and the lower section is slidable along the length of upper section, the second pulley is installed at a bottom of the lower section.

10. The lawn mower according to claim 7, wherein the fixing plate further comprises a handle on a side thereof.

11. The battery package assembly according to claim 7, wherein the battery package assembly comprises six first pulleys and four supporting legs, four of the six first pulleys are distributed on four corners of the battery package assembly, and the other two first pulleys are located on the middle of two longitudinal sides of the battery package assembly; four supporting legs are arranged at four corners of the fixing plate.

12. The lawn mower according to claim 7, wherein the frame comprises a plurality of guiding rails, the guide rails are arranged in rows for guiding the first pulleys to roll inside.

13. The lawn mower according to claim 7, further comprising a rear cover 17, wherein the rear cover is fixed to the frame and covers the battery package assembly to prevent the battery package assembly from being exposed.

14. The lawn mower according to claim 1, wherein the installation and disassembling direction is a longitudinal direction of the battery package assembly, each supporting leg in the folded state is configured to extend from the top end thereof, along the longitudinal direction of the battery package assembly, towards a center line connecting two center points of two longitudinal sides of the battery package assembly, but the bottom end of each supporting leg does not extend beyond the center line.

15. The battery package assembly according to claim 1, wherein the battery package is fixed to the fixing plate by connecting members to form an integral component with the fixing plate.

16. The battery package assembly according to claim 6, further comprising a plurality of mounting brackets each having an opening, wherein the top end of each supporting leg is pivotally connected to the opening of a corresponding mounting bracket; and each mounting bracket is further provided with a blocking wall for preventing the corresponding supporting leg located in a vertical direction from continuing to rotate away from the gravity center position.

17. The battery package assembly according to claim 1, wherein each supporting leg is openable automatically.

* * * * *